CIRCUIT ARRANGEMENT FOR CONTROLLING A VOICE-FREQUENCY SPECTRUM BY MEANS OF BINARY SIGNALS

Filed Sept. 9, 1963 2 Sheets-Sheet 1

INVENTOR.
BURGHARDT HERMANN JOSEF VOLLMER

BY Hane and Nydick

ATTORNEYS

CIRCUIT ARRANGEMENT FOR CONTROLLING A VOICE-FREQUENCY SPECTRUM BY MEANS OF BINARY SIGNALS

Filed Sept. 9, 1963 2 Sheets-Sheet 2

INVENTOR.
BURGHARDT HERMANN JOSEF VOLLMER
BY Hane and Nydick
ATTORNEYS

United States Patent Office 3,370,243
Patented Feb. 20, 1968

3,370,243
CIRCUIT ARRANGEMENT FOR CONTROLLING A VOICE-FREQUENCY SPECTRUM BY MEANS OF BINARY SIGNALS

Burghardt Hermann Josef Vollmer, Jakobsberg, Sweden, assignor to Telefonaktiebolaget L M Ericsson, Stockholm, Sweden, a corporation of Sweden Filed Sept. 9, 1963, Ser. No. 307,433
Claims priority, application Sweden, Sept. 17, 1962 10,006/62
3 Claims. (Cl. 330—21)

ABSTRACT OF THE DISCLOSURE

There is disclosed the format circuits of a formant vocoder. Each of the formant circuits includes an inductor connected between input and output terminal means. Connected to the junction of the inductor and the output terminal means are a plurality of tuning capacitors. Connected to each tuning capacitor is a base-operated transistor switch. Each transistor base is connected to an output of a binary decoder. The inputs to the decoder receive binary-coded combinations of signals. Therefore, a resonant circuit is established which includes the inductor and a capacitor selected in accordance with the received binary coded combination of signals.

The present invention refers to a circuit arrangement for controlling a voice frequency spectrum by means of binary signals, especially in the synthesis part of an analysis-synthesis speech transmission system or vocoder. In a certain type of vocoder, the so-called formant vocoder, the continuity within certain parts of the envelope of the frequency spectrum is utilized when reconstructing the spectrum in the synthesis part of the vocoder. This is carried out by means of so-called formant circuits, each of which, in order to produce a reconstruction of the frequency spectrum as correct as possible, gives a frequency spectrum whose envelope is similar to a resonance curve within its range and which is dimensioned in such a way that the resonance frequency and the bandwidth are variable in accordance with a certain pattern.

A frequency spectrum of the type defined above can be obtained by means of an LC-circuit. A disadvantage, however, is that when varying the capacitance in the shunt branch of the LC-circuit by means of a reactance circuit, it is possible to vary the resonance frequency but not the bandwidth since the loss angle in the reactance circuit has a fixed relation with the capacitance value. In the same manner, a variation of the inductance in the series branch will cause a change of the bandwidth which is fixedly connected with the inductance, so that by varying the capacitance and inductance it is not possible without further measures to bring about an arbitrary change of the bandwidth or the resonance frequency.

An object of the invention is to produce a circuit which has a high stability, can exactly reproduce different patterns and has a high signal to noise ratio.

The circuit arrangement according to the invention is substantially characterized by the fact that it comprises an LC-circuit with a number of capacitors each arranged in the emitter-collector circuit of an associated transistor. The bases of the transistors are connected to the outputs of a translating means which, in dependence on the binary signals supplied to its input, produces signals on outputs corresponding to the respective binary signals in order to connect to the shunt branch of the LC-circuit one of the capacitors which is selected so as to have the required capacitance and loss angle in order to determine the resonance frequency and the bandwidth of the LC-circuit.

A circuit according to the invention permits each of the capacitors to be combined with a resistance selected in such a way that the loss angle has the desired value. Accordingly, the exact reproduction of a desired pattern is obtained.

Figure 1:
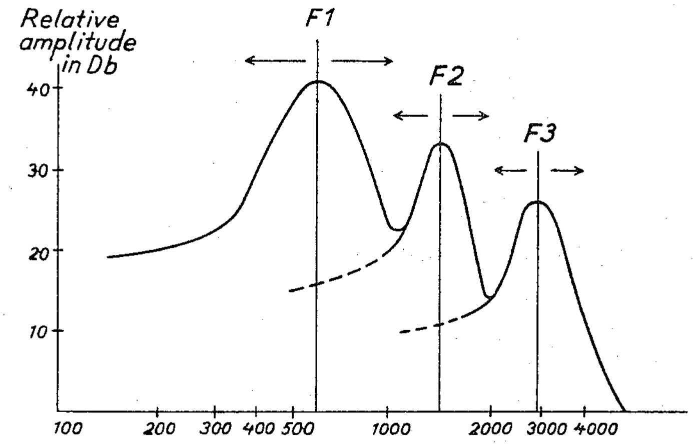
Figure 2:
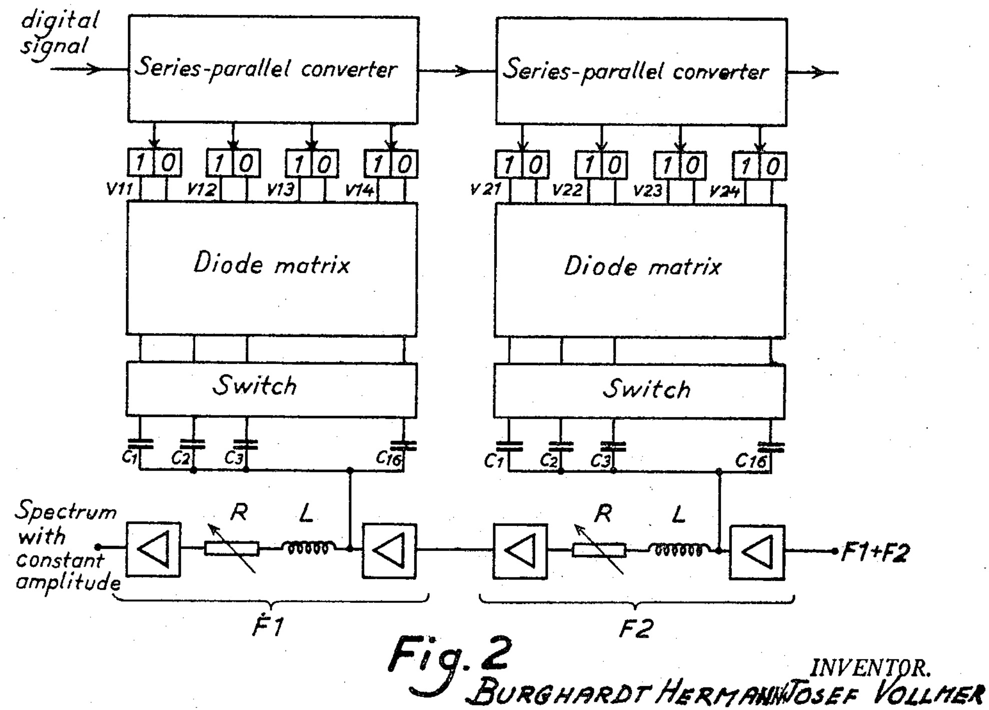

The invention will be explained hereinafter by means of an embodiment by making reference to the accompanying drawing in which: FIG. 1 shows a frequency spectrum which must be reconstructed in the synthesis part of a formant vocoder; FIG. 2 shows a block diagram of two formant circuits in the synthesis part of a formant vocoder, and FIG. 3 shows a circuit diagram of the circuit according to the invention.

FIG. 1 shows in logarithmic scale an example of a frequency spectrum which must be reconstructed by means of a circuit according to the invention. In order to produce a correct reconstruction it is necessary to have the possibility to vary the bandwidth and to displace the peaks in both directions in the frequency spectrum which can be considered to consist of resonance curve-shaped frequency spectra.

FIG. 2 shows a block diagram for the synthesis part of a formant vocoder comprising a formant circuit according to the invention. To a control input trains of binary signals are supplied containing information for control of, for example, three formant circuits and other information for, for example consonant reproduction. In FIG. 2, there is shown only the control of the formant circuits F1 and F2. According to the embodiment the control of the formant circuits is carried out by means of sixteen parameters defined by a four-position binary number. The four binary signals belonging to each formant circuit such as circuit F1 are obtained from the pulse train by means of, for example, a series-parallel converter which supplies the four binary signals to four flip-flops V11–V14. In correspondence to the obtained binary signal, a signal is obtained on four of the eight outputs of the flip-flops V11–V14 while on four outputs no signal is obtained. These eight outputs are brought to a diode matrix which translates the information thus obtained into a hexidecimal information, so that one of sixteen outputs of the diode matrix changes potential in accordance with the binary information obtained. The sixteen outputs of the matrix are supplied to a switch according to the invention, the function of which will be explained more fully below. In FIG. 2 the switch is shown only symbolically together with the LC-circuit which has sixteen capacitors in the shunt branch and has one inductance, one adjustable resistance and one input and one output amplifier in the parallel branch.

Figure 3:
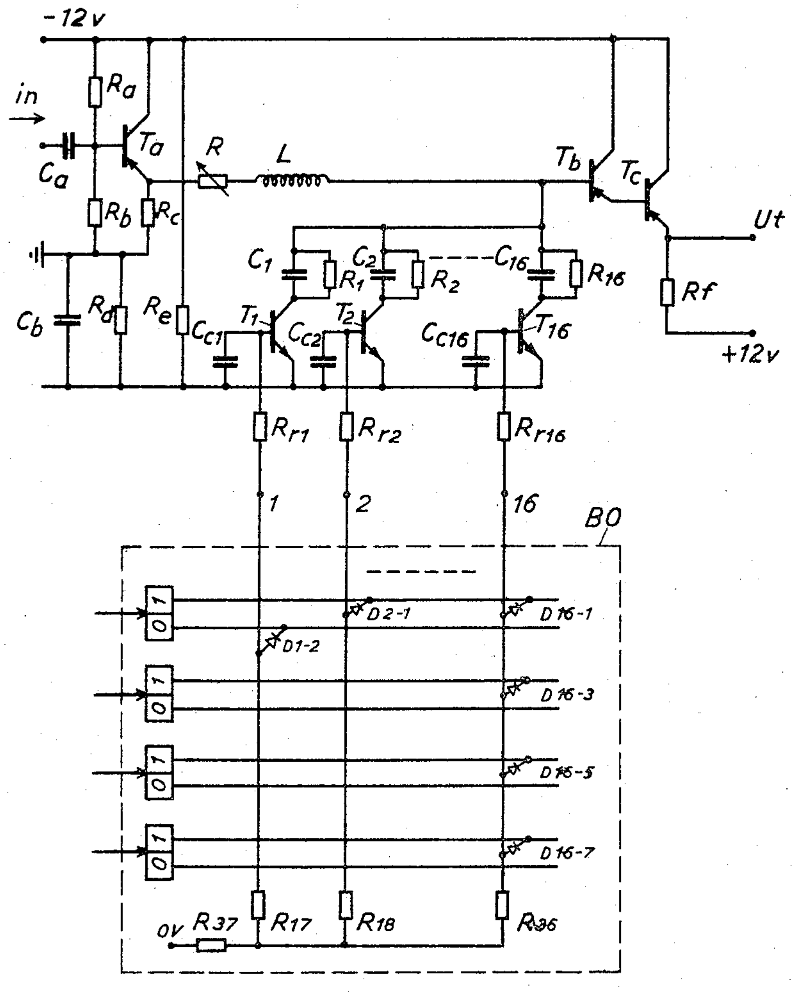

FIG. 3 shows a conventional binary translator B0 consisting of a diode matrix in which the diodes are arranged in the crossing points of eight incoming and sixteen outgoing wires. The "0"-output terminals of the flip-flops have so low a potential, for example −5 v. that the diodes connected between these and the wires of the hexidecimal system are conducting, whereby these last mentioned wires are maintained at the low potential. If, however, a binary signal is supplied to one of the flip-flops, a higher voltage, for example −1 v. at the "1"-output terminal of the flip-flop will be obtained, so that all diodes which are connected to said wire will be blocked. Therefore, a higher voltage will be obtained through that one of the wires in the hexidecimal system, to which the other terminal of the diodes is connected. The outputs of the binary translator are through RC-circuits, for example $Cc1$–$Rr1$, connected to the base of transistors T1, T2, etc. If the potential of a base terminal is increased, the respective transistor will conduct. In the collector circuit of each transistor there is connected one of the capacitors C1–C16 which capacitors together form the shunt branch of the LC-circuit. Due to the fact that the transisor belonging to the respective capacitor becomes conducting, this capacitor will be connected between the inductance L and ground. In this way a desired resonance frequency for the LC-circuit can be obtained. The input LC-circuit is provided with an emitter follower in order to transform the input impedance from for example 10 kiloohms to 200 ohms. At the output there is arranged a double emitter follower having an input impedance of for example about 1 megohm and an output impedance of about 10 kiloohms. The advantage of the circuit according to the invention is that all transistors and matrix diodes arranged in the capacitor branches and in the flip-flop are bottomed, so that a temperature variation will not influence the stability of the circuit. The resonance frequency and the bandwidth of the circuit will be determined only by the inductance and the connected capacitor. This allows a long term high stability, in other words security against aging phenomena, but facilitates also the exact reproduction of different spectrum patterns. In consequence of the fact that it is possible to connect in parallel with each capacitor a resistance R1, R2, etc. selected in a suitable way it is possible to determine completely the loss angle and thus the bandwidth of the circuit. A considerable advantage is the high signal to noise ratio, for example up to 60 db in the switching in comparison with earlier known arrangements, for example a reactance circuit in which the pulse signal may not exceed a definite, relatively low threshold value in relation to the noise-level.

I claim:

1. A circuit having a transfer characteristic in the form of a resonance curve of required resonance frequency and bandwidth comprising a signal input terminal means, a signal output terminal means, an inductor connected between said terminal means, a plurality of capacitors, each of said capacitors having first and second terminals, means for connecting the first terminal of each of said capacitors to the junction of said inductor and said output terminal means, a plurality of transistors, each of said transistors including base, emitter and collector terminals, means for connecting the emitter terminals of each of said transistors to ground, means for connecting the collector terminal of each of said transistors to the second terminal of each of said capacitors respectively, a binary decoder means including a plurality of input terminals adapted to receive binary-coded combinations of signals and a plurality of output terminals, and means for connecting each of the output terminals of said binary decoder means to the base terminal of one of said transistors respectively whereby one of said capacitors is operatively connected to said inductor in accordance with a particular binary-coded combination of signals.

2. The circuit of claim 1 further comprising a plurality of resistors, each of said resistors being connected in parallel with one of said capacitors respectively.

3. The circuit of claim 1, wherein said signal input terminal means comprises an emitter-follower amplifier having an input and an output, said input being adapted to receive varying signals and said output being connected to said inductor; and wherein said signal output terminal means comprises an emitter-follower amplifier having an input and an output, said input being connected to said inductor and said output being adapted to transmit signals.

References Cited

UNITED STATES PATENTS

| | | | |
|---|---|---|---|
| 2,817,707 | 12/1957 | Weibel | 179—1 |
| 2,855,508 | 10/1958 | Barlow et al. | 333—76 X |
| 3,095,539 | 6/1963 | Bennett et al. | 333—76 X |
| 3,158,685 | 11/1964 | Gerstman et al. | 179—1 |

ROY LAKE, *Primary Examiner.*

KATHLEEN H. CLAFFY, *Examiner.*

R. MURRAY, J. B. MULLINS, *Assistant Examiners.*